United States Patent Office 3,485,645
Patented Dec. 23, 1969

3,485,645
HETEROGENEOUS GLASS
John Douglas MacKenzie, Schenectady, N.Y., and George E. Sleighter, Natrona Heights, Pa., assignors to PPG Industries, Inc., Pittsburgh, Pa., a corporation of Pennsylvania
No Drawing. Filed Oct. 21, 1965, Ser. No. 500,189
Int. Cl. C03c 3/00
U.S. Cl. 106—47                  5 Claims

ABSTRACT OF THE DISCLOSURE

The present invention relates to a new glass composite material. More particularly, the present invention relates to a new composite material having unique properties produced by dispersing glass flakes of one composition and a lubricant throughout the glassy matrix of another glass composition. It especially relates to a machinable, heterogeneous glass composite consisting of 50–60 percent by weight of a glass matrix of one composition, 25–35 percent by weight of glass flakes of another composition dispersed throughout the glass matrix and exhibiting a higher softening point temperature than the softening point temperature exhibited by the glass matrix and 15–20 percent of a lubricant.

---

The present invention relates to a new composite material. More particularly, the present invention relates to a new composite material having unique properties produced by dispersing glass flakes of one glass composition throughout the glassy matrix of another glass composition.

Several materials have been dispersed in a glassy matrix to produce a composite material in the prior art. U.S. Patent 1,756,383 issued to Foster Dale Snell, Apr. 29, 1930, for example, discloses a composite suitable for use as a blackboard. The composite consists of a glassy matrix having dispersed uniformly throughout it granules of an opaque inert mineral harder than the base glass composition. The minerals suggested are chromite, chrome iron ores and magnetite. The glassy matrix is an ordinary soda-lime-silica glass similar to commercial plate or window glass.

Mica has also been suggested to be dispersed throughout a glassy matrix to produce a new composite material. U.S. Patent 2,669,764 issued to James S. Kilpatrick, Feb. 23, 1954 discloses an insulating material produced by mixing a white glass frit, barium carbonate and phlogopite mica. The white glass frit is composed of cryolite, barium carbonate, potassium carbonate, soda ash and boric acid. In preparing the composite, the raw batch materials are first ground to a size small enough to pass a 100 mesh screen. The white glass frit batch materials, barium carbonate and phlogopite mica are then combined in a ratio of approximately one third each by weight. This mixture is then dampened, formed into billets and dried. The billets are then fired at a temperature of about 850° C. After firing, the billets are transferred to a heated injection mold where they are formed into their final desired shape at a temperature of 300° C. to 500° C. The final molded products are taught to exhibit good dielectric properties.

U.S. Patent 3,047,409 issued to G. Slayter, July 31, 1962, discloses a technique for combining metals and glass. These metal-glass composites are taught to exhibit superior properties when used in heated environments. The composites are stated to exhibit improved dimensional stability and resistance to creep compared to pure metals. The glass-metal composites exhibit higher viscosities at elevated temperatures compared to pure metals making their fabrication at elevated temperature easier.

U.S. Patent 2,693,668 issued to Games Slayter, Nov. 9, 1954, discloses a highly internally stressed heterogeneous glass composite. The composite is made by dispersing one glass composition in fibrous form throughout a glassy matrix of another different composition. The fiber and matrix glass compositions are selected to have coefficients of thermal expansion such that the fibrous glass component is placed in tension and the matrix glass component is placed in compression when the composite is cooled to room temperature from an elevated temperature. The fibrous glass component is also selected to have a higher modulus of rupture than the matrix glass component. The fibrous component of the composite then absorbs the load before the glassy matrix component reaches its elastic limit. Fabricating the composite in this manner is taught to help prevent the propagation of cracks through the composite material.

What has been discovered in the present invention is a new composite material produced by dispersing glass flakes of one glass composition throughout the glassy matrix of a different glass composition. The new composite is capable of being easily fabricated into useful shapes by several means, is resistant to crack propagation and is readily machined using ordinary metal working tools.

Due to the unique characteristics of the new composite, it is suitable for fabrication into structural members such as I beams, channels and angles. Because glass is highly resistant to various hostile environments such as salt water, corrosive atmospheres and high temperature, the new composite material is suitable for many applications in which metals cannot be used. The composite can also be used as an alternative material for various ceramic products such as sewer pipes and low pressure fluid conducting lines. In this regard, the composite material can also be combined with other composite materials, such as glass reinforced plastics, to produce various specialty products.

The new composite of the present invention, since it exhibits a high strength to weight ratio, possesses unique resistance to various hostile environments and has excellent machinability using ordinary metal-working tools, constitutes a valuable addition to the available inventory of special materials for various specialty applications.

Broadly, the new composite material of the present invention is prepared by mixing flakes of one glass composition, a lubricating material and a glass matrix batch of a composition other than the flake composition in any suitable mixing container. The batch ingredients are mixed dry and then pressure molded at room or elevated temperature to the desired shape. The press molded article is then fired to produce the final desired product. The batch materials of the composite can also be heated until the matrix glass composition is in a plastic state and then injection molded or extruded to form the final desired shape.

The present invention will be more fully understood by making reference to the following example.

The example is the preferred embodiment of the present invention and constitutes the best mode presently contemplated by the inventors for carrying out the teachings of their invention.

EXAMPLE

Glass flakes approximately 2 to 5 microns thick of the following base glass composition were selected as the dispersed component of the new composite.

GLASS FLAKE COMPOSITION

| Component: | Percent by weight |
|---|---|
| $SiO_2$ | 54.4 |
| $Al_2O_3$ | 13.4 |
| $CaO$ | 21.7 |
| $MgO$ | 0.4 |
| $B_2O_3$ | 8.5 |
| $F_2$ | 0.5 |
| $Na_2O$ | 0.7 |
| $TiO_2$ | 0.5 |
| $Fe_2O_3$ | 0.2 |

The glass flakes exhibit a softening point temperature of about 1600° F. and were purchased from Owens-Corning Fiberglas Corporation, Toledo, Ohio. The softening point temperature of a glass is defined as the temperature at which the glass exhibits a viscosity of $10^{9.5}$–$10^{10}$ centipoises.

The flakes were pulverized until they passed through a Standard 60-mesh screen and were retained on a Standard 100-mesh screen. The size range of these flakes was between 149 microns and 250 microns in diameter.

A cone blender was then filled with 2.2 grams of the screened glass flakes and 1.4 grams of lubricating graphite. The flake graphite particle range was between 100 and 150 microns in diameter. The graphite and glass flakes were then thoroughly mixed to coat the glass flakes with the flake graphite.

The following calculated chemical composition was then selected as the matrix glass of the composite:

| Component: | Percent by weight |
|---|---|
| $P_2O_5$ | 68.2 |
| $BaO$ | 21.9 |
| $PbO$ | 4.87 |
| $CaO$ | 3.65 |
| $Li_2O$ | 1.22 |
| $Al_2O_3$ | 0.12 |

A glass of the matrix glass composition was prepared by mixing the indicated raw batch materials presented below in an 800 milliliter Pyrex beaker:

MATRIX GLASS BATCH

| Batch Ingredient: | Grams |
|---|---|
| Phosphoric acid (85% $H_3PO_4$) | 340.0 |
| Barium oxide | 72.0 |
| Lead oxide | 16.0 |
| Calcium oxide | 12.0 |
| Lithium oxide | 10.0 |
| Aluminum oxide | 0.4 |
| | 450.4 |

The phosphoric acid was placed in the Pyrex beaker first and the other batch materials then added. The raw batch was thoroughly mixed by stirring with a Pyrex stirring rod.

The beaker was then placed on a wire screen support and slowly heated to a temperature of about 932° F. over a period of 1 hour using a Bunsen burner. The temperature was then raised to 1400° F. and held there for an additional 1½ hours. The temperature of the melt was then reduced to 1200° F. for an additional ½ hour. The beaker was then removed from the burner and the molten matrix glass poured onto a steel plate to form a glass patty approximately ¼ inch thick by about 6 inches in diameter. The glass patty weighed about 325 grams. When the glass patty had cooled to about 400° F., it was placed in an oven at a temperature of about 400° F. The power to the oven was then turned off and the glass was slowly allowed to cool to room temperature over a period of about 2 hours to anneal the glass. The glass thus prepared was water clear and of good optical quality. The specific gravity of the glass was determined to be about 2.95 grams per cubic centimeter and exhibited an index of refraction of about 1.547.

The glass patty was then pulverized until the matrix glass particles passed through a 200-mesh screen and were retained on a 325-mesh screen. The size range of the matrix glass particles was between 44 and 74 microns.

The previously prepared graphite coated glass flakes were then mixed with 4.5 grams of the screened matrix glass by tumbling in a cone blender. The mixed raw materials for the composite were then placed in a 1-inch diameter cylindrical pellet mold. The mold was coated with Aerolon G, a dry film lubricant purchased from Acheson Colloids Company, Port Huron, Mich., to prevent sticking of the pellet in the mold during pressing. The composite batch was then hot pressed under a load of 2,000 pounds and at a temperature of about 675° F. in a press mold provided with an electrical resistance heater. The load and temperature were maintained for 5 minutes. The electric power to the resistance heater was then turned off and the mold was allowed to cool by standing in air for about 10 minutes. The 2,000 pound load was maintained until the temperature of the mold had dropped to approximately 300° F. and then was slowly released. After the temperature of the mold had further decreased to about 150° F., the pellet was removed from the mold. The pellet was in the shape of a right cylinder approximately 1 inch in diameter and ¼ inch in height.

The pellet was found to have a modulus of rupture of 6,000 pounds per square inch tested by beam loading techniques. The test sample was prepared by cutting the pellet to form a 3/16 of an inch by 3/16 of an inch by 1 inch bar. Other test pellets 1 inch in diameter and ¼ inch in height formed in the identical manner described above were easily drilled using a 3/16 inch standard high speed metal working twist drill.

In addition to flake graphite used in the example, other lubricating parting materials, such as molybdenum disulfide, may be incorporated in the new composite of the present invention. Any other high temperature lubricant which is not wet by the glassy matrix could also be used. It has been found that as the amount of lubricating material in the composite is increased, the machinability also increases; however, the modulus of rupture strength exhibits a corresponding decrease.

Many combinations of glass flake compositions and glass matrix compositions can be devised in addition to that disclosed in the example.

The preferred family of matrix glass compositions of the present invention is presented below:

| Component: | Percent by weight |
|---|---|
| $P_2O_5$ | 55.0–80.0 |
| $BaO$ | 15.0–30.0 |
| $CaO$ | 2.0–6.0 |
| $PbO$ | 3.0–7.0 |
| $Li_2O$ | 0.5–2.0 |
| $Al_2O_3$ | 0–1.0 |

This family of glasses is preferred because it defines glasses exhibiting softening points between about 650° F. and 700° F. Many other relatively low softening point glass compositions are also suitable in producing the new composites of the present invention. Depending upon the electrical properties of the selected flake and matrix glass compositions, for example, various types of semi-conducting components such as resistors, capacitors or temperature sensing devices (thermocouples) can be fabricated.

It is also within the scope of the present invention to disperse very low coefficient of thermal expansion glasses in flake form in the matrix glass. Glasses such as silica flakes, Vycor flakes, or mixtures of these glasses and the flakes disclosed in the example can be used. Various combinations of high and low coefficients of thermal expansion flakes and matrices can be adopted, depending on the properties desired in the final composite. Selecting a low coefficient of thermal expansion flakes or a mixture of such flakes (silica or Vycor) and a low coefficient of thermal expansion matrix composition of relatively high softening point, for example, permits the production of a composite which can be used to fabricate cooking ware.

In compounding the glass compositions of the dispersed flake glass and the matrix glass, one of the most important considerations is the relative melting points of the glass compositions selected. The flake glass composition must have a melting point which is higher than the matrix glass composition melting point to prevent the flakes from dissolving in the matrix glass during fabrication. In this regard, the solubility of the flake glass in the matrix glass at the forming temperatures employed must also be considered to insure that even though the melting point of the flakes is not exceeded the flakes are not inadvertently dissolved by the matrix glass.

In the present invention, the weight percent ranges of the flake, lubricant and matrix components of the composite should preferably be between the following limits to produce a machinable product:

| Component: | Weight percent |
|---|---|
| Glass flakes | 25–30 |
| Glass matrix | 50–60 |
| Lubricant | 15–20 |

A composite containing more than 80 percent by weight matrix glass loses its desirable machinability. As the matrix glass weight percent increases above 80 percent, the properties of the composite approach that of a homogeneous glass. Glass composites containing less than about 40 percent by weight matrix glass lose strength and become increasingly more friable as the weight percent of matrix glass decreases.

The maximum and minimum ranges of the other components of the present invention are presented below. Composites containing concentrations of these two components outside these ranges are usually too similar to homogeneous glass in properties or are too weak for practical applications.

| Component | Maximum percent by weight | Minimum percent by weight |
|---|---|---|
| Glass flakes | 50 | 10 |
| Lubricant | 50 | 10 |

Pellets have also been fabricated in accordance with the procedure of the example presented above having flexural strengths of 12,000 to 12,500 pounds per square inch. These pellets contained 3.5 grams of glass flakes having the same composition as the flakes of the example, and 3.5 grams of the preferred glass matrix of the example. These pellets, however, did not contain a lubricant and did not exhibit good machinability characteristics.

It is also within the scope of the present invention to incorporate opaque or colored glass flakes in various proportions throughout a low melting glassy matrix to produce colored bricks or architectural panels which have the advantages of being more non-porous and stronger than common clay based bricks.

One of the unique characteristics of incorporating glass flakes in a glassy matrix and then pressing the composite to fabricate the desired product is that the flakes tend to orient themselves perpendicular to the pressure applied during the forming operation. This preferential orientation of the flakes in the composite develops different strength and electrical characteristics in the article, depending upon the direction in which the sample is being tested. Crack propagation is inhibited to a greater degree in the direction that the load was applied in forming the composite article because of the laminar type of flake orientation developed. The composite can also be fabricated to readily laminate when subjected to shear forces if so desired in a direction normal to the direction used in pressing the composite much in the manner of flake graphite or mica.

We claim:

1. A heterogeneous machinable glass composite consisting of 50–60 percent by weight of a glass matrix of one composition, 25–30 percent by weight of glass flakes of at least one composition other than that of the matrix glass and 15–25 percent by weight of a lubricating material selected from the class consisting of flake graphite, molybdenum disulfide and mixtures thereof, the glass flakes component being dispersed throughout the glass matrix and exhibiting a higher softening point temperature than the softening point temperature exhibited by the glass matrix.

2. A heterogeneous glass composite according to claim 1 in which the glass matrix composition consists essentially of the following ingredients, in percent by weight: 55.0 to 80.0 percent $P_2O_5$, 15.0 to 30.0 percent BaO, 2.0 to 6.0 percent CaO, 3.0 to 7.0 percent PbO, 0.5 to 2.0 percent $Li_2O$, and 0 to 1.0 percent $Al_2O_3$.

3. A heterogeneous glass composite according to claim 1 in which the glass flake composition consists essentially of the following ingredients, in percent by weight: 54.4 percent $SiO_2$, 13.4 percent $Al_2O_3$, 21.7 percent CaO, 0.4 percent MgO, 8.5 percent $B_2O_3$, 0.5 percent $F_2$, 0.7 percent $Na_2O$, 0.5 percent $TiO_2$, and 0.2 percent $Fe_2O_3$.

4. A heterogeneous glass composite according to claim 1 in which the matrix glass consists essentially of the following ingredients, in percent by weight: 68.2 percent $P_2O_5$, 21.9 percent BaO, 4.87 percent PbO, 3.65 percent CaO, 1.22 percent $Li_2O$, and 0.12 percent $Al_2O_3$.

5. A heterogeneous glass composite according to claim 1 in which the dispersed glass flakes are flakes of silica.

References Cited

UNITED STATES PATENTS

| 2,197,562 | 4/1940 | Reinker | 106—54 |
| 2,669,764 | 2/1954 | Kilpatrick | 106—47 |
| 2,693,668 | 11/1954 | Slayter | 106—54 |
| 3,215,543 | 11/1965 | Bre | 106—47 |

JAMES E. POER, Primary Examiner

U.S. Cl. XR.

106—54, 56; 252—502, 518